(12) United States Patent
Flenley

(10) Patent No.: US 6,505,178 B1
(45) Date of Patent: Jan. 7, 2003

(54) AUTOMATIC TELLER MACHINE WITH SECURE VARIABLE STORAGE FOR INTERNET APPLICATIONS

(75) Inventor: John Martin Flenley, Havant (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/474,598

(22) Filed: Dec. 29, 1999

Related U.S. Application Data

(62) Division of application No. 09/075,736, filed on May 11, 1998, now Pat. No. 6,282,618.

(30) Foreign Application Priority Data

Nov. 28, 1997 (GB) .............................................. 9725111

(51) Int. Cl.[7] .............................................. G06F 17/60
(52) U.S. Cl. .............................. 705/43; 705/35; 705/42; 705/39; 705/16; 705/21
(58) Field of Search .............................. 705/43, 35, 42, 705/39, 16, 21

(56) References Cited

U.S. PATENT DOCUMENTS

| | | | | |
|---|---|---|---|---|
| 5,905,248 A | * | 5/1999 | Russell et al. ......... | 235/462.15 |
| 5,933,816 A | * | 8/1999 | Zeanah et al. ................. | 705/35 |
| 6,085,177 A | * | 7/2000 | Semple et al. ............... | 235/379 |
| 6,098,053 A | * | 8/2000 | Slater .......................... | 705/35 |
| 6,102,797 A | * | 8/2000 | Kail ......................... | 273/138.1 |
| 6,173,269 B1 | * | 1/2001 | Soloki et al. .................. | 705/35 |

* cited by examiner

Primary Examiner—B. James Peikari
(74) Attorney, Agent, or Firm—Jeanine S. Ray-Yarletts

(57) ABSTRACT

A memory controller component (10, 30, 40) for an Internet application such as a bank, airline or supermarket web site is disclosed. The component is instantiated from a web page in the application and exposes a number of methods. A connect method checks if a predetermined area of named shared memory has been allocated, and responsive to the named shared memory not being allocated, allocates named shared memory. A setVariable method allocates an area in the shared memory for a variable and stores the variable. A getVariable method locates the variable in shared memory. Corresponding get and set encrypted variable methods are also disclosed. Furthermore, an ATM running an Internet browser enabling a user to swap between web sites at an ATM is disclosed.

3 Claims, 2 Drawing Sheets

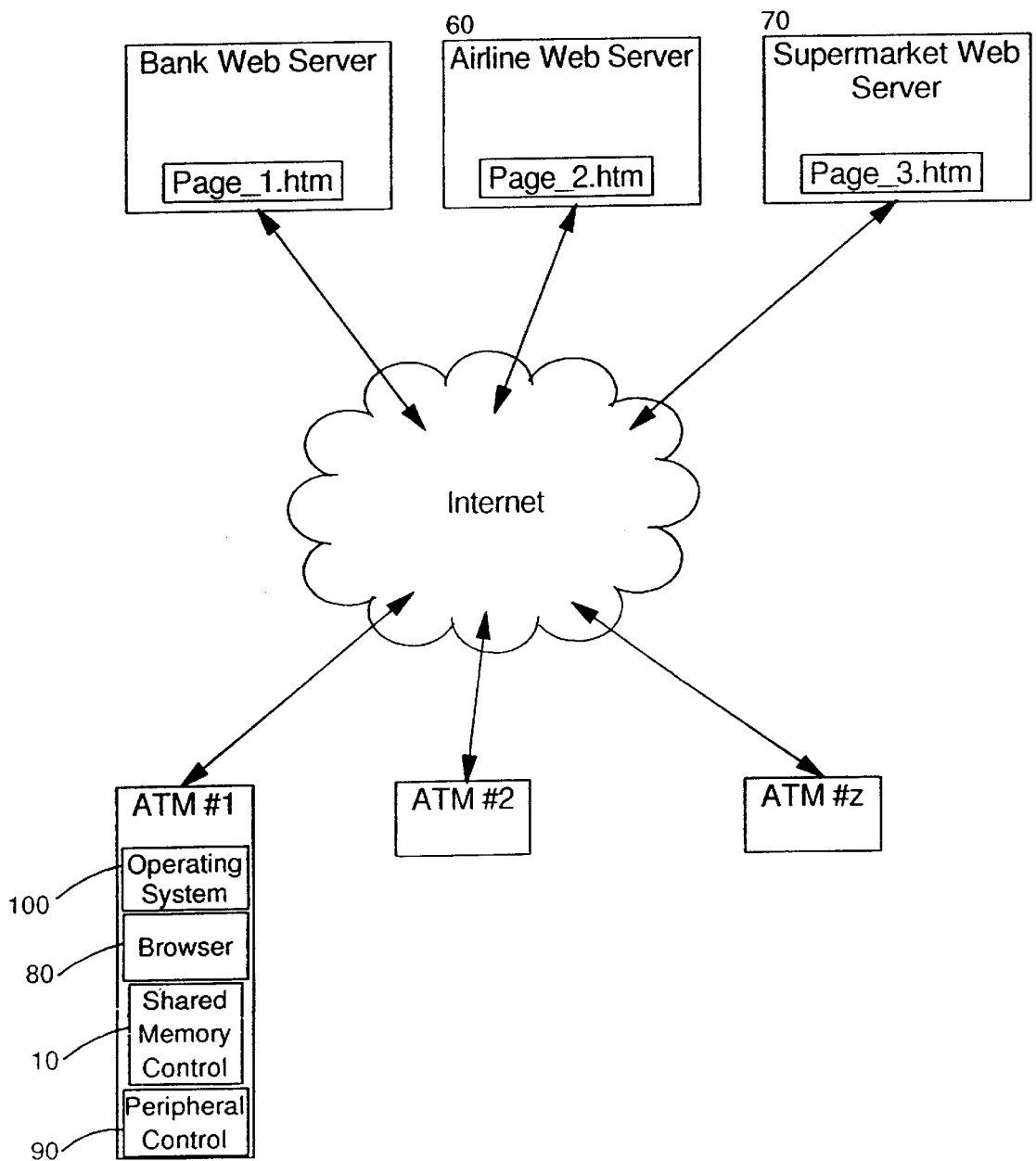

AUTOMATIC TELLER MACHINE WITH SECURE VARIABLE STORAGE FOR INTERNET APPLICATIONS

This application is a divisional of application Ser. No. 09/075,736, now U.S. Pat. No. 6,282,618, filed on May 11, 1998.

FIELD OF THE INVENTION

The present invention relates to a memory controller component for Internet Applications and an ATM including such a memory controller component.

BACKGROUND OF THE INVENTION

There is a requirement for Internet Banking and Financial Services Applications, to keep information (such as account details, PIN numbers etc.) available and secure when a user swaps between web pages. The user may swap pages within a site, for example, when conducting on-line banking and swapping from one account transaction to another; or when a user swaps between pages on different sites such as from their bank's web site to a utility, supermarket or airline web site. It is important, if such inter- or intra-site commerce is to be conducted, for data relating to the user to be persistent between web pages, because requesting the user to enter a card number or PIN multiple times is not viable from a usability viewpoint.

A 'cookie' mechanism, well known in the prior art, attempts to overcome this problem. This mechanism, however, is both unwieldy and not guaranteed to be successful as the acceptance of cookies is a browser determined function.

SUMMARY OF THE INVENTION

Accordingly, in a first aspect the present invention provides a memory controller component for an Internet application, comprising one or more web pages, said component being adapted to be instantiated from one of the or each web page and comprising: connect means adapted to check if a pre-determined area of shared memory has been allocated, and responsive to said shared 10 memory not being allocated to allocate said shared memory; variable setting means adapted to allocate an area in shared memory for a variable and to store said variable; and variable retrieval means adapted to locate said variable in shared memory.

In the further aspect the invention provides an ATM including the memory controller component according to the first aspect of the invention.

The first aspect of the invention preferably provides a ACTIVEX or JAVABEAN memory controller component that can be attached to a web page written using the JAVASCRIPT or VBSCRIPT extensions to HTML (hypertext mark-up language), or the JAVA language, to store and retrieve variable data, in either secure (encrypted) or insecure (clear) modes. Other web pages, that can reside on other servers, can also access this data via their. own instance of the memory controller component, providing an easy to use and secure method of transferring sensitive data between pages.

BRIEF DESCRIPTION OF THE DRAWINGS

FIG. 2 is a schematic view of a set of ATMs including the memory controller of FIG. 1.

DETAILED DESCRIPTION OF THE PREFERRED EMBODIMENT

Figure 1:
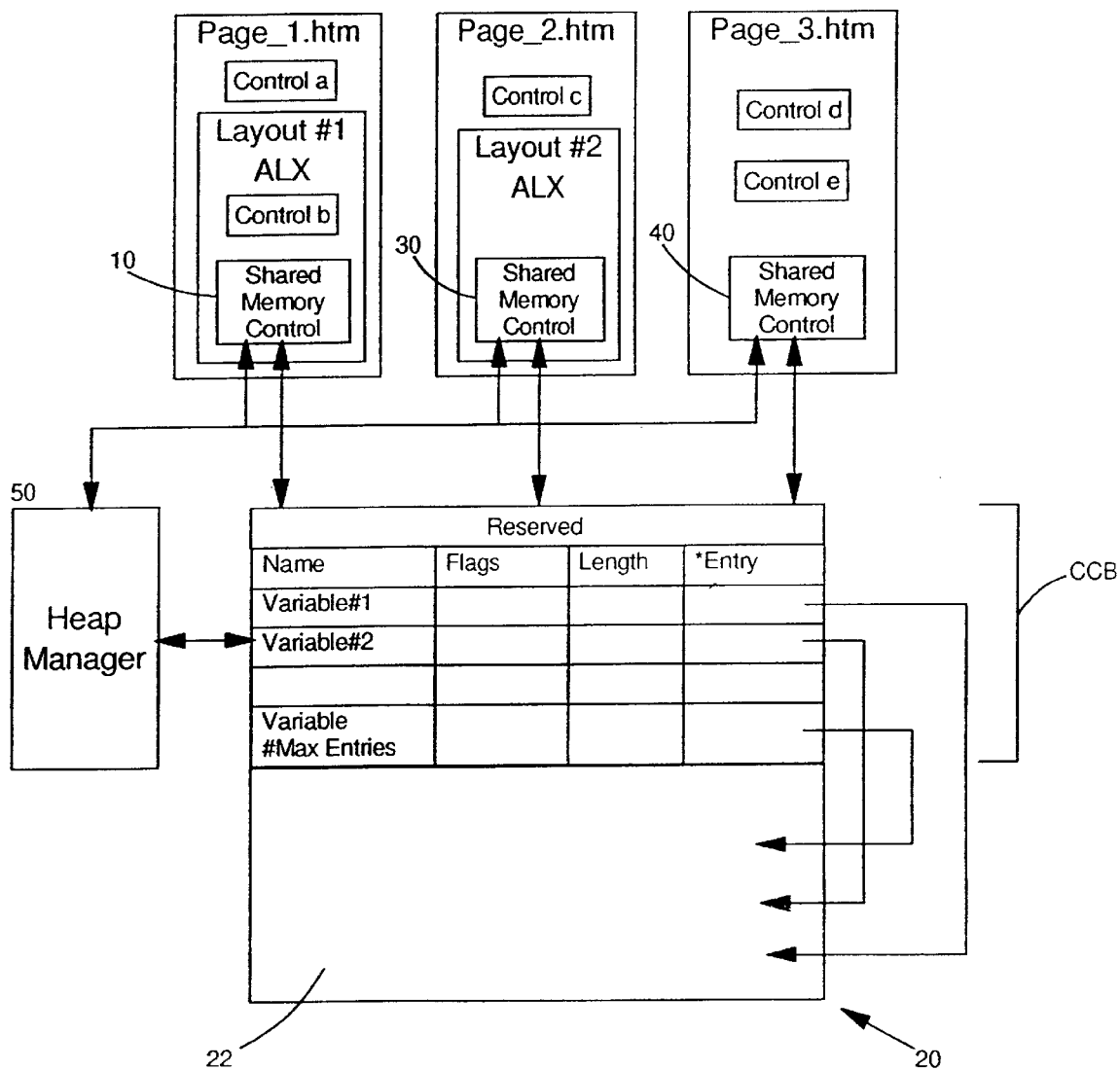
FIG. 1 is a schematic view of a set of Internet Applications employing the memory controller component according to the present invention.

The present embodiment will be described in terms of ActiveX controls for an Internet Explorer web browser from Microsoft, although it will be seen that the invention is applicable to other languages, web browsers and operating systems, for example, JAVA and JAVASCRIPT, Netscape and OS/2.

A memory controller component according to the invention manipulates an area of shared memory 20 allocated by a first instance of the component 10 and manipulated by subsequent instances of the component 30, 40. The component 40 is instantiated directly from a HTML file, Page__3, or alternatively as with the components 10 and 30, the component can be instantiated from a script file, for example, layout#1.alx which in turn is included in Page__1. Including a script file in a HTML file can be achieved, for example, by using the following syntax:

```
<OBJECT CLASSID="clsid:nnnnn ID="Html_Layout1 "
    STYLE
    "LEFT:0pt;TOP:0pt">
<PARAM NAME="ALXPATH" REF VALUE="d:\ . . . .
    \layout#1.alx">
</OBJECT>
```

The CLASSID attribute specifies the type of component that is to be loaded: "clsid:" indicates an ActiveX control; whereas "java:" would indicate a Java applet. "clsid:" is followed by an ActiveX control's registry key number "nnnnn". This key uniquely identifies the particular ActiveX control and is the same on every Windows'95 and Windows NT 4 Machine. <PARAM..> tags are parameters, passed to the ActiveX control, to determine, for example, how the control is to present itself. In this case the ActiveX control "nnnnn" for laying out a page is passed a reference to the location of the script file layout#1.alx located on a local D: drive on a machine running the browser.

In either case, the syntax for including a memory controller component 10, 30, 40, in this case called MemoryControl, in either the HTML file or the ALX file is, for example:

```
<OBJECT ID="MemoryControl" CLASSID="clsid:xxxxx
    STYLE
    "TOP:0pt;LEFT:0pt;WIDTH:75pt;ZINDEX:0;">
<PARAM NAME=.....>
</OBJECT>
```

In this case "xxxxx" represents the key number for the memory controller ActiveX control. This control resides in an .OCX file on the local disk on the browser machine and is registered for use with any web pages that need to use the memory controller according to the invention. It should therefore be seen that, in the ActiveX embodiment, the script file or HTML file only includes references 10, 30, 40 to the memory controller or any of the other Controls a . . . e, and that the software for the controls is actually stored on a local disk. In an JAVA embodiment, however, Applets are downloaded every time a page is accessed.

The inclusion of a reference to an ActiveX control exposes a number of methods, which can be called from within the HTML file or the ALX file, by prefixing the name of the method with the OBJECT ID. Thus, a method is called using the following syntax:

```
<SCRIPT LANGUAGE="JavaScript" FOR "Enable"
EVENT="Click( )">
<!- -
```

MemoryControl.abcd 1;
\\--<
where "abcd" is the name of the method. In this example, a button called "Enable" has a "click" event. The button could, for example, be any one of Controls a . . . e included in the web page using the <OBJECT> tag described above. The button is displayed when the HTML page is downloaded and, when clicked by the user, calls the method "abcd", setting its state to "1".

The methods exposed by the memory controller according to the present embodiment are as follows:

Connect(NewValue)
SetVariable(VariableName, ValueName)
GetVariable(VariableName)
Storekey(KeyNumber, KeyValue)
SetVariableEnc(VarName, ValueName, KeyNumber)
GetVariableEnc(VarName, KeyNumber)
EncryptKey(KeyTarget, KeySource)
DeleteAll( )
DeleteKey(KeyNumber)

Connect is passed a variable NewValue. This has a value "1" to indicate a web page wishes to connect to shared memory 20 and a value "0" to indicate a web page wishes to disconnect from shared memory. When connect is called with NewValue="1", it first -checks to see if a heap manager program 50 has been instantiated, if not the heap manager is instantiated. The heap manager, when instantiated allocates a named area of shared memory, in the present embodiment 4 Mb in size. In Windows NT, this is done using a system call "CreateFileMapping", whereas in OS/2 two system calls are needed, "DosAllocSharedMem" to check if the named memory has been allocated and "DOSGet-NamedSharedMem" to allocate the named memory.

The named shared memory 20 contains a component control block (CCB), plus a large area of 'heap' space 22 to store data. The CCB is mostly taken up with an array of control structures that specify details of individual variables stored by the component. Each structure contains:

1. The name of the variable, up to a finite length.
2. The length of the variable data (for encryption)
3. A control flags field for internal usage.
4. An internal offset pointer to where the data resides.

Space is allocated for a finite number, Max Entries, of these structures, preferably several thousand. The heap manager 50 preferably allocates the space using the virtual memory page file of the operating system, so that efficient management of the memory used, ie. paging in and out of physical memory, is under the control of the native operating system.

Once the heap manager 50 is instantiated, the connect method can check a reserved field in the CCB. If this field contains a pre-determined string value, then connect knows the CCB has been initialised. If not, then the contents of the CCB array is cleared.

Further instantiations of the shared memory controller 30, 40 or whichever order the web pages are accessed in, will also seek to connect their respective web pages to shared memory 20. In these cases, however, when connect is called, it will see that the named shared memory has been allocated and so all these web pages need is the start address of shared memory 20. Each web page application can then call the remaining methods to manipulate the shared memory 20 as required.

SetVariable is used to store variables in unencrypted format. Variables are stored or retrieved by setting the VariableName and ValueName parameters and calling SetVariable. ValueName, ie. the variable data, is preferably passed as an ASCII string, terminated with a null character. SetVariable checks the validity of the properties and if acceptable, the CCB array is checked to see if a variable of that name is already in existence. If it is, then the memory already allocated to the existing data is freed and a new allocation request is made to the heap manager 50 for a memory block of the size required to hold the new data. The heap manager 50 allocates memory from the heap 22 of shared storage and its real address is modified to show just the offset from the start of shared memory 20 storage. It is this offset which is then stored in the CCB array.

This technique is employed because the shared memory 20 may not exist in the same address location in the different web page processes that attach to the shared memory 20. The 'real' address of any specific variable data will therefore be different for each process, however, if each process knows what the base address of its instance of shared memory is, its instance of the memory controller component 10, 30, 40 can calculate at run time what the 'real' address of the required variable data is by adding that to the stored offset of the variable data in the CCB.

getVariable is the retrieval method corresponding to SetVariable. By simply setting VariableName, GetVariable can search the CCB for the variable's offset address within the heap 22 and return the variable data at this address in the form of a string to the calling script.

StoreKey stores keys used by other methods as volatile keys (ie they cannot be saved and are not persistent) in binary format in the Windows NT registry HKEY_CLASSES_ROOT key, using a non-obvious nomenclature within the key. Keys are stored as binary values, but are passed into StoreKey as a hexadecimal representation in ASCII, ie 10123ABCD". StoreKey then manipulates the data into binary 0x0123ABCD" prior to storing the key in the Windows registry.

It will be seen that, because they are volatile, any stored encryption keys will be lost once the local machine is turned off. Thus, a page can set encryption keys on the local machine during a browser session with little possibility of the keys being recovered by unauthorised users.

It will be seen that where hardware encryption can be used, encryption keys would. be stored in the physical device used for the encryption functions.

SetVariableEnc corresponds to SetVariable but is used where data is to be encrypted before being stored in shared memory 20. The KeyNumber property is set to the required encrypt key number prior to calling SetVariableEnc. In the case of an encrypted variable, the process is the same as for Setvariable except that the variable data is encrypted or decrypted using either the DES or RSA algorithms and the key specified in the KeyNumber property prior to calling the encrypt method.

GetVariableEnc allows a script to recall encrypted variables, by setting the KeyNumber with which the variable was encrypted. If the incorrect key number is used then garbage will be returned, or if GetVariable is used to try and recover an encrypted variable, a null value will be returned.

Encryptkey allows the user to encrypt or decrypt keys multiple times prior to their use. There are no methods for retrieving keys, so a potential hacker would have to have access to the local machine the memory controller component was running on in order to stand any chance of finding the encryption keys in use.

DeleteAll deletes all encryption keys from the Windows registry and DeleteKey deletes the key specified by KeyNumber.

Using the shared memory controller of the invention enables smooth inter-site electronic commerce. If, for example, page_1.htm were a bank web page, then it can be designed to take a user's account details and verify the user's identity by, for example, getting the user to set PIN number or other secret details, which can be stored in singly encrypted or multiply encrypted format on a local machine. It should be noted that at this stage the user's information need not be transmitted to the bank and can remain only on the local machine for access at a later time by bank web pages or web pages from other compatible sites.

The user can be prompted by the bank web page to swap web pages within the bank web site or to swap to web pages of any other web sites who also employ a shared memory controller according to the invention. The pages for these web sites can now look at any data set by the user when at the bank web page and can, for example, verify to the other web site that the identity or the credit limit of the individual is valid. It will be seen that unlike 'cookies' the domain name of the web server for other sites from which, for example, Page_2.htm and Page_3.htm are received, need not be related to the domain name for bank site from which Page_1.htm is received.

The above scenario can be implemented on a conventional desktop computer. It will be seen, however, that many automatic teller machines (ATM) include PC compatible computers or at least computers of this power. Many have touch screens or function buttons allowing a sophisticated level of interaction between the user and the ATM Application.

An ATM according to another aspect of the present invention includes the memory controller 10 according to a first aspect of the invention, appropriate Internet browser software 80, for example Internet Explorer from Microsoft, and compatible ATM operating system software 100 for example Windows NT from Microsoft, FIG. 2.

In the present embodiment a Bank ATM Application is written as a page, Page_1.htm, or series of pages for the Internet browser 80. At least one page will include a reference to the controller 10 to connect the browser to shared memory 20 and expose the methods described above.

Each ATM#1 . . . z further includes another ActiveX control 90 which, when referenced in a web page, exposes methods for controlling ATM peripherals (not shown) such as a printer, keypad, magnetic stripe reader etc. The ATM Application pages include an appropriate user interface, so that a user is first prompted to insert a card into the magnetic stripe reader. The ATM Application pages are able to call methods exposed by the peripheral controller 90 for reading the users card and PIN number, thus verifying the user's identity. The ATM Application can write information to shared memory such as the user's available credit limit. The ATM Application can then prompt the ATM user to swap to other sites by, for example, displaying buttons on the ATM screen which can be touched by the user to select a site.

By swapping to other sites, for example, an Airline booking system site 60, the user can for example select a flight and pay for the flight directly from the ATM using the user's bank account information already stored in shared memory. Other sites could be utility company sites, at which the user could pay a bill, or supermarket sites 70, at which a user could cash in loyalty points. Thus, in one transaction a user, as well as inserting a credit card, could also insert an air miles card which can also be read by the ATM magnetic stripe reader. The user could cash in loyalty points for air miles at their supermarket site 70 and then swap to an airline site 60 and pay for a ticket using these air miles, all without entering information more than once.

It will be seen that, because several stages may be involved in any particular transaction using an ATM according to the invention, appropriate transaction processing methodology, for example two-phase commit, should be employed when udating resources such as a user's balance, air miles total etc.

What is claimed is:

1. An Automatic Teller Machine comprising:
   a. a processor connected to
   b. a memory,
   c. a screen display,
   d. a user input means,
   e. a card reader, and
   f. a storage medium, said storage medium being adapted to store
      i. operating system software,
      ii. Internet browser software cooperable with said operating system software to display Internet web pages on said screen display and to receive user input from said user input means;
      iii. a peripheral controller component adapted to be instantiated from a web page and comprising means for reading a card inserted in said card reader; and
      iv. a memory controller component operable by a plurality of Internet applications, each Internet application comprising one or more web pages, said component being adapted to be instantiated from any one or more of the web pages and comprising:
         connect means adapted to check if a pre-determined area of memory shareable by more than one web page has been allocated by another instance of said component instantiated from a different web page, said different web page belonging to another Internet application than that comprising the page which instantiated said component, and responsive to said shared memory not being allocated, to allocate said shared memory;
         variable setting means adapted to allocate an area in shared memory for a variable and to store said variable; and
         variable retrieval means adapted to locate said variable in said shared memory.

2. An ATM as claimed in claim 1 comprising:
   a. a printer; and
   b. a cash dispenser;
wherein said peripheral controller comprises means for controlling said printer and said cash dispenser.

3. An ATM as claimed in claim 1 wherein said user input means comprises one or more of a numeric keypad, a set of function keys and a touch screen.

* * * * *